July 30, 1968  H. B. C. DHONAU  3,394,618
POWER TRAIN
Filed July 18, 1966  2 Sheets-Sheet 1

INVENTOR.
Herman B. C. Dhonau
BY
Charles L. White
ATTORNEY

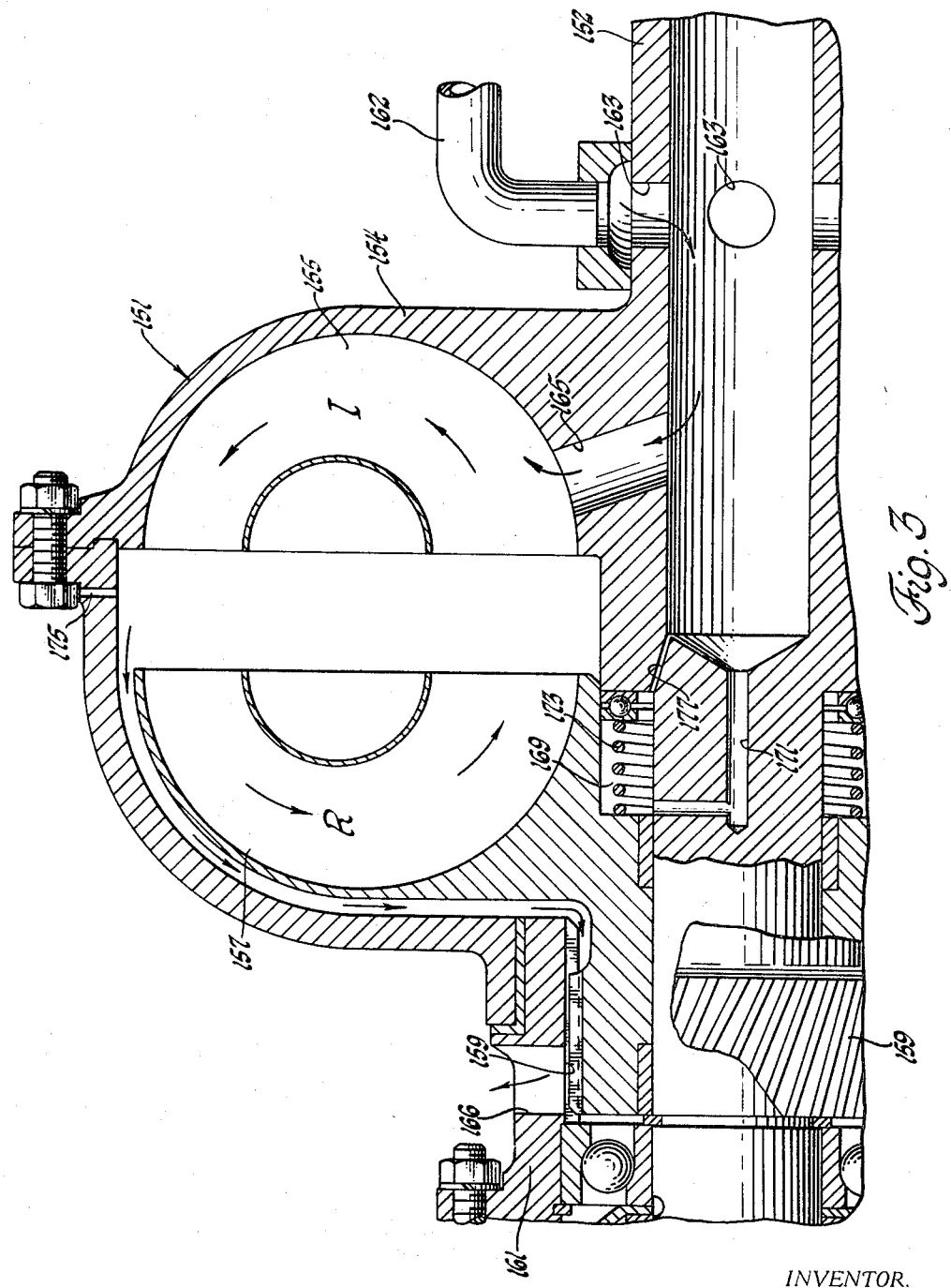

3,394,618
POWER TRAIN
Herman B. C. Dhonau, Indianapolis, Ind., assignor to General Motors Corporation, Detroit, Mich., a corporation of Delaware
Filed July 18, 1966, Ser. No. 565,998
12 Claims. (Cl. 74—731)

ABSTRACT OF THE DISCLOSURE

A power transmission in which the load is effectively disconnected from the gas turbine engine output on engine start so that a standardized starter may be utilized to rapidly start the engine regardless of the work load. This transmission further features automatic controlled work load pick-up to prevent engine stall. A fluid coupling is utilized to disconnect the engine and work load prior to engine start. The coupling is gradually filled by a pump driven by a differential drive having one input driven by the coupling input and a second input driven by the coupling output. As the load is accelerated, the difference in speed of the differential inputs will decrease and accordingly decrease the supply of fluid by the pump.

---

This invention relates to power trains and particulraly to an improved power train for advantageously transmitting the output of an engine to a work load. This invention includes automatic and gradual pick-up of the work load by the engine subsequent to engine start.

To rapidly bring an engine, such as a gas turbine engine, up to a speed in which the compressor furnishes sufficient compressed air to the combustion chambers so that the gases exiting therefrom will drive the power turbine and the coupled compressor turbine at a self-sustaining speed, high-speed starters are employed. This rapid engine start is highly desirable to avoid development of excessively high temperatures in the gas turbine power section, possibly damaging the power turbine and other elements therein. In applications where the work load is solidly connected to the engine output, it is necessary to provide starters with a sufficient output to move the work load as well as the engine load to bring the engine up to its self-sustaining speed. This requires starters with high outputs which must be generally tailored to a particular work load, precluding the use of a standardized starter for installations utilizing the same basic engine.

An object of this invention is to provide a new and improved power train.

Another object of this invention is to provide an improved power train for advantageously transmitting power plant output to a load in which there is controlled load pick up avoiding engine stall and permitting the use of standardized engine starters regardless of work load.

Another object of this invention is to provide a power train for coupling an engine and work load, including hydraulic coupling means for coupling and uncoupling the work load to the power plant output, and to provide a differentially driven fluid supply pump so that as the load is accelerated the difference in speed of the differential dual drive shafts will decrease to reduce fluid supply to the coupling thereby providing appropriate oil supply for all percentages of coupling slip.

Another object of this invention is to provide (1) an improved power train for coupling the output of a gas turbine engine to a load and incorporating a fluid clutch device in which the load is disconnected from the output on engine start and (2) a differentially driven pump to supply fluid to the fluid clutch in accordance with differential input so that the load may be gradually picked up by the engine and (3) mechanically-driven and fluid-driven drive gears synchronized so that the mechanical drive may be coupled directly to the load subsequent to drive of the load by the hydraulic drive.

Another object of this invention is to provide dual power trains from dual engines to a load in which each power train includes a coupling differentially driven in accordance with output speed of the engine and output speed of fluid couplings to provide for gradual load pickup by both of the engines and featuring a direct drive of the load by the engines subsequent to hydraulic drive thereof.

Another object of this invention is to provide an improved fluid coupling in which the coupling runner and impeller are linearly movable with respect to each other to vary coupling torque transmittal.

These and other objects of the invention will become apparent from the detailed description of this invention and the drawings in which:

FIGURE 3 is a sectional view of a fluid coupling.

Figure 1:
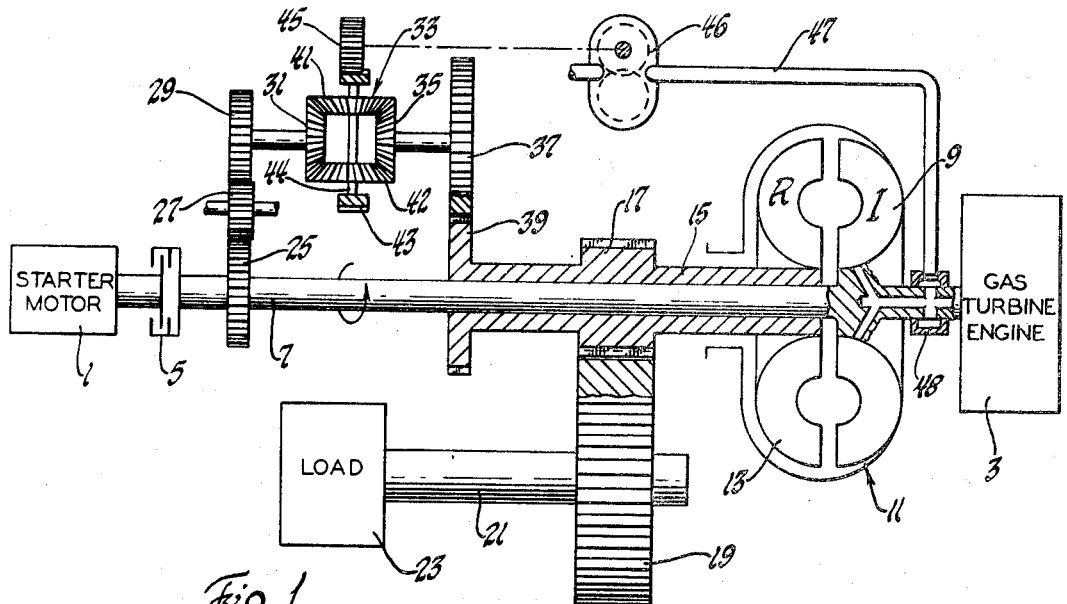
FIGURE 1 is a diagrammatical illustration of the first embodiment of the invention.

As shown in FIGURE 1, there is a starter 1 for gas turbine engine 3 which can be selectively coupled to or uncoupled from the engine by a multi-plate friction clutch 5. The drive shaft 7 is used the couple the output of the clutch 5 to compressor and turbine rotors not shown within engine 3, enabling the starter to drive these rotors to a self-sustaining speed for engine operation. The shaft 7 is also the output of engine 3 and drives an impeller 9 of a fluid coupling 11. This coupling includes a runner 13 to which is secured an output sleeve shaft 15. The sleeve shaft carries a spur gear 17 that meshes with a spur gear 19 to provide a reduction ratio. The spur gear 19 is secured to a driven shaft 21 that is coupled to a load 23 such as a compressor or a propeller.

The drive shaft 7 also carries a spur gear 25 which drives an idler 27. The idler in turn drives a spur gear 29. Spur gear 29 is operatively coupled to drive a side bevel gear 31 of a differential unit 33 which includes a second bevel side gear 35 driven by spur gear 37 which is directly driven by spur gear 39. As shown, the spur gear 39 is secured to one end of the runner driven sleeve shaft 15. The differential also includes output bevel gears 41 and 42 and an output spur gear 43. Gears 41 and 42 are rotatably mounted with respect to gear 43 by suitable pivot structure such as pivot pin 44. As shown, spur gear 43 drives meshing spur gear 45 and the input of fluid pump 46. This differentially driven pump pumps working fluid from a sump or other suitable fluid source (not illustrated) through a passage 47 to the gland 48 connected to the coupling 11.

The differentially driven pump operates to regulate the quantity of oil supplied to the coupling which is initially empty so that the engine will automatically pick up the load as the work load is accelerated by the engine. Initially, the pump output will be relatively high due to the large differences in speeds of input bevel gears 31 and 35. This high pump output is advantageous in cooling the coupling which at this time has its highest slip. However, as coupling slip reduces, the speed of runner driven bevel gear 35 approaches the speed of output driven bevel gear 31. The output of the pump will be accordingly reduced along with coupling cooling requirements.

In operation, the starter is used to bring the engine to an example 2200 r.p.m. when the fuel is ignited. The starter is left in engagement until the engine is accelerated to 8500 r.p.m. and then clutch 5 is disengaged. The engine is then brought up to 12,500 r.p.m. rapidly to prevent excessive high turbine temperatures. During the start of the engine, the coupling 11 is empty so that work load 23 is not coupled to the starter; therefore, the starter may be of a comparatively low horsepower.

The coupling may be designed with a two and one-half percent slip when at coupling. When the coupling is empty and the gas turbine power section is up to speed, the differentially driven oil pump may yield a maximum oil flow of 150 g.p.m. for a nine second pick up of load. As the load is accelerated, the pump output will decrease until, at coupling, a flow of 4.4 g.p.m. is established.

But this construction standardized starters may be utilized to start the engine regardless of work load and the controlled fill of the coupling gradually couples the load to the engine to prevent possible engine stall. To prevent possible engine stall under full load a scoop such as that disclosed in U.S. Patent 2,491,483 to J. Dolza et al. may be employed to regulate the quantity of fluid in the coupling.

Figure 2:
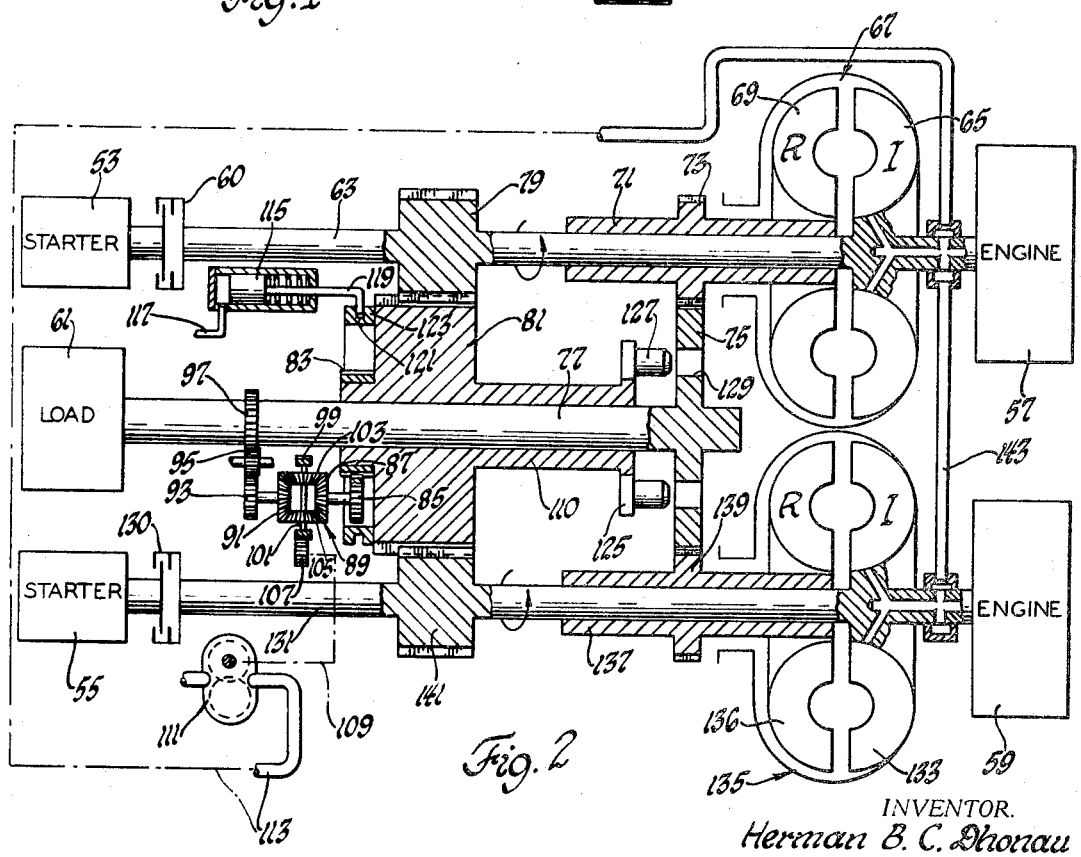
FIGURE 2 is a diagrammatical illustration of another embodiment of this invention.

In the embodiment of FIGURE 2 it will be seen that there are twin power trains for coupling dual engines to a single load. However, it will be appreciated that a single power train may be used to couple one engine to the load with the other engine and power train being omitted. As shown, starters 53 and 55 are utilized for starting dual gas turbine engines 57 and 59 which are coupled by identical power trains to a single work load 61.

The starter 53 can be coupled by selectively engageable clutch 60 to a drive shaft 63 which is coupled to the compressor and power turbine of engine 57. On engine operation, the power turbine will drive the shaft 63 and connected impeller 65 of the fluid coupling 67.

When the coupling is hydrodynamically operating, the impeller will drive the runner 69 which drives an output sleeve shaft 71 rotatably mounted on shaft 63. Shaft 71 carries an integral spur gear 73 which meshes with a spur gear 75 rigidly connected to output shaft 77 coupled to work load 61. Spur gears 73 and 75 provide a reduction ratio so that the high turbine speeds are readily usable in driving the load. The shaft 63 has a spur gear 79 secured thereto that meshes with a spur gear 81 rotatably mounted on the output shaft 77. The ratio of gear 73 to gear 75 is higher than the ratio of gear 79 to gear 81 by the amount of slip in the coupling so that gears 81 and 75 will run at the same speed to facilitate the direct connection of the load of the engine described below.

Spur gear 81 carries an integral spur gear 83 that meshes with the spur gear 85 to drive an input bevel gear 87 of a differential 89. The differential 89 has an opposing input bevel gear 91 driven by a spur gear 93. This latter spur gear meshes with idler 95 driven by output shaft 77. The idler 95 is interposed between the spur gears 93 and 97 so that the bevel gear 91 will be driven in a direction reverse from that of the bevel gear 87 as in embodiment of FIGURE 1. The differential has an output gear 99 which carries pin 101 on which the bevel gears 103 and 105 are rotatably mounted. The differential output gear 99 meshes with a spur gear 107, which drives a fluid pump 111 through a suitable mechanical drive 109. This pump, when driven by the differential, pumps fluid to the coupling 67 through passage 113.

As in the FIGURE 1 embodiment, the differential pump supplies fluid to the coupling in proportion to the difference in input speeds to the differential with pump output progressively decreasing as the speed of bevel gear 87 progressively approaches the speed of bevel gear 91. As in the FIGURE 1 embodiment the appropriate amount of working fluid is supplied for all percentages of coupling slip for adequate coupling cooling.

In this construction operator mechanism is provided to eliminate coupling slip at full load to thereby provide an efficient, direct mechanical drive. This operator may be in the form of a fluid operated piston 115 biased by a fluid pressure from a control valve (not shown) through a pressure line 117. The piston is coupled to the spur gear 81 by means of an elongated piston rod 119, that is hooked at one end for reception into slot 121 formed in a collar 123 that is suitably secured to the gear 81. The gear 81 is formed with a sleeve portion 110 and an end flange 125. The flange 125 carries projecting pins 127 which are adapted to be received into openings 129 formed in the spur gear 75 to provide a direct drive from the engine to the load after the coupling speed has been obtained. The engagement of pins 127 into openings 129 is accomplished by pressurizing line 117 and moving the gear 81 laterally subsequent to synchronization of gears 81 and 75. Upon obtaining direct drive the output of the pump will be very small or zero and the fluid coupling will be emptied through suitable drain openings.

For engine start the starter 55 for the second power train may be coupled by selectively engageable clutch 130 to the drive shaft 131 connected to the compressor and power turbine (not shown) of engine 59. The power turbine of this engine drives the shaft 131 and the connected impeller 133 of the fluid coupling 135. When the coupling of hydrodynamically operating the impeller 133 drives the runner 136 and the output sleeve shaft 137. This sleeve shaft has an integral spur gear 139 which meshes with the spur gear 75. The shaft 131 has a spur gear 141 secured thereto that meshes with the output shaft mounted on spur gear 81. The coupling is filled by working fluid pumped by pump 111 through the passage 143 as illustrated.

In operation of the FIGURE 2 embodiment starters 53 and 55 are utilized to start the engines 57 and 59 subsequent to application of clutches 60 and 130. The couplings are initially empty and therefore the starters will not have to drive the work load 61, but will only have to accelerate the engine compressor and power turbine to a self-sustaining speed. Due to the fact that the work load is not coupled to the starter, the engines can rapidly reach this self-sustaning speed. Due to the differential drive of pump 111 the couplings will fill and begin to transmit torque from the engines to the load through the ratio provided by spur gears 73 and 139 and meshing spur gear 75. As in the first embodiment the pump output proportionally decreases as the speed of output shaft increases. When the couplings 67 and 135 reach a coupling phase of operation, coupling slip is eliminated by applying pressure to the apply side of piston 115. The piston will move in its housing and will slide spur gear 81 to the right and since spur gears 81 and 75 will be synchronized, the pins 127 will enter the openings 129 so that there will be direct mechanical drive from the engines to the load.

The coupling 151 of FIGURE 3 may be used instead of coupling 11 of FIGURE 1 and couplings 67 and 135 of FIGURE 2. Coupling 151 is a unit wherein the coupling runner and impeller have maximum separation for minimum torque transfer and minimum spacing for maximum torque transfer. A drive shaft 152 corresponds to the drive shaft 7 in FIGURE 1 and extends from an engine such as engine 3. Shaft 152 drives coupling housing 154 and attached impeller 155 which rotates out of the plane of the drawing and pumps fluid to drive the runner 157. The runner 157 is coupled by right spiral splines 159 to an output sleeve shaft 161 which is coupled to a load by a reduction ratio as in the FIGURE 1 embodiment.

Fluid is supplied to coupling 151 by a differentially driven pump through passage 162 and opening 163 formed in the drive shaft 152. This fluid will enter the coupling through an opening 165 provided in the coupling housing 154 and through a passage 166 back to a sump (not illustrated). As shown, the separation between the runner and impeller is caused by the force of return spring 173 located in this chamber. An exhaust 175 is used to exhaust the coupling when fluid is not being supplied thereto by the pump.

The amount of runner-impeller separation regulates amount of torque transfer in coupling 154. Initially, there is a large separation between impeller 155 and runner 157; coupling slip is high and there is little or no transfer of torque by the coupling. However, as the coupling is filled and torque transfer occurs, the runner will move toward the impeller by virtue of the spiral spline connection to a position in which the load can be accelerated. This closing movement is restrained by oil trapped in chamber 169. This trapped oil is pushed out of space 169 through a small bore 177 back into shaft 152. Since this unit automatically regulates torque transmitted, it is effective to prevent possible engine stall. When the coupling is exhausted, the return spring again provides for maximum runner-impeller separation.

Many other modifications and embodiments of the invention may be made utilizing the basic teachings of this invention. It is, therefore, to be understood that the invention is not to be restricted to that which has been particularly described and shown, but only by the claims which follow.

I claim:
1. In a power transmission for transmitting engine torque to a load, transmission input means operatively connected to the engine, transmission output means operatively connected to the load, a fluid unit having an input rotor operatively connected to the transmission input and an output rotor operatively connected to the transmission output, fluid pump means operatively connected to said fluid unit for pumping fluid thereto, a differential having first and second inputs operatively connected to said transmission and having an output drivingly connected to said pump, said differential having said first input driven at a speed directly proportional to transmission input speed and having said second input driven at a speed directly proportional to transmission output speed, said differential output and said pump output decreasing in proportion to decreases in the difference in the differential input speeds.

2. The power transmission defined in claim 1 and further including means for starting the engine, said fluid unit being conditioned for minimum torque transmitting capacity when said starter is initially utilized to start the engine and increasing torque transmitting capacity as the engine accelerates the load, said fluid unit being furnished with decreasing amounts of working fluid in proportion to decreasing coupling slip as the load is accelerated by the engine.

3. The power transmission defined in claim 2 in which said fluid unit includes an impeller coupled to the engine output and further includes a runner, means connecting said runner to the load, said last mentioned means being operatively coupled to drive said second input of said differential.

4. The power transmission defined in claim 3 and further including friction means engageable to operatively connect said starter means to the engine thereby permitting said starter to crank said engine to a predetermined firing speed, said friction means being disengaged from the engine as engine torque accelerates the engine to an operational speed.

5. In combination, engine means including first and second engines for driving a load, power transmission means for operatively connecting said engines to the load, said transmission means including fluid coupling means having first rotor menas operatively connected to said engine means and second rotor means operatively connected to the load, control means operatively connected to said fluid coupling means for controlling the torque transmitted by said fluid coupling means, said control means including pump means for simultaneously supplying working fluid to each of said couplings in direct relationship to coupling slip and a differential drive for driving said pump, said differential drive having input means driven by said transmission.

6. The combination of claim 5 in which said power transmission means have a common output drive shaft, and gear means for coupling the output of each of said couplings to said drive shaft, and drive means operative to couple said engine output directly to said output drive shaft to establish a mechanical drive to the load.

7. In a power train for transmitting engine output to a load, fluid coupling means including an impeller and a runner, pump means for supplying fluid to said coupling, differential drive means operatively connected to said power train for driving said pump means, means coupling said impeller to the engine output, said pump responding to maximum coupling slip to furnish maximum quantities of fluid to said coupling and responding to decreasing coupling slip to furnish proportionate decreasing quantities of fluid to said coupling, a drive shaft driven by said runner coupled to said load, means movably coupling said runner to said drive shaft, said last mentioned means enabling said runner to move toward said impeller thereby decreasing coupling slip as torque transfer occurs across said coupling.

8. The power train defined in claim 7, a fluid chamber between said runner and said impeller for receiving fluid supplied by said pump, the fluid in said chamber being trapped on movement of said runner toward said impeller to oppose further movement of said runner toward said impeller as the load is accelerated by the engine, bleed passage means for gradually exhausting the fluid from said chamber on movement of said runner toward said impeller.

9. The power train in claim 7 in which said means coupling said runner and said drive shaft meshing spiral splines forward on said runner and said drive shaft.

10. In a power transmission, a hydrodynamic unit having a plurality of rotors, a drive member for driving a first of said rotors, a driven member, means coupling said driven member to a second of said rotors, means for supplying working fluid to said unit, said last mentioned rotor being movable toward the first of said rotors in response to predetermined torque transfer by said unit to reduce coupling slip, biasing means exerting a force opposing movement of said second rotor toward said first rotor, and control means for relieving the force of said biasing control means as said second rotor is moved toward said first rotor.

11. The power transmission of claim 10 in which said means coupling one of said rotors to said driven member is a spiral spline connection.

12. The power transmission of claim 11, said unit being a fluid coupling having an impeller and a runner, a pressure chamber located between said rotors, means for simultaneously supplying fluid to said coupling and said chamber, the fluid in said chamber being trapped on movement of said runner toward said impeller, a bleed passage for regulating exhaust of fluid from said chamber as said runner moves toward said impeller.

References Cited

UNITED STATES PATENTS

| | | | |
|---|---|---|---|
| 1,868,130 | 7/1932 | Bauer et al. | 60—54 X |
| 2,018,616 | 10/1935 | Martyrer et al. | 60—54 |
| 2,073,357 | 3/1937 | Wemp | 60—54 |
| 2,089,590 | 8/1937 | Walti | 60—54 |
| 2,126,547 | 8/1938 | Fottinger | 60—54 X |
| 2,303,829 | 12/1942 | Dodge | 60—54 X |
| 2,359,930 | 10/1944 | Miller | 60—54 |
| 2,385,059 | 9/1945 | Buthe | 74—731 X |
| 2,691,269 | 10/1954 | Chamberlain | 60—54 |
| 2,792,722 | 5/1957 | Stefan | 74—731 X |
| 2,893,368 | 7/1959 | Long | 123—179 |

FOREIGN PATENTS 808,339  2/1959  Great Britain.

FRED C. MATTERN, JR., *Primary Examiner.*

THOMAS C. PERRY, *Assistant Examiner.*

UNITED STATES PATENT OFFICE
CERTIFICATE OF CORRECTION

Patent No. 3,394,618                                        July 30, 1968

Herman B. C. Dhonau

It is certified that error appears in the above identified patent and that said Letters Patent are hereby corrected as shown below:

Column 1, line 27, "particulraly" should read -- particularly --. Column 2, line 28, "the", first occurrence, should read -- to --; line 37, "driven" should read -- drive --. Column 3, line 45, "of" should read -- to --. Column 4, line 21, "of" should read -- is --. Column 5, line 65, "menas" should read -- means --.

Signed and sealed this 16th day of December 1969.

(SEAL)
Attest:

Edward M. Fletcher, Jr.                        WILLIAM E. SCHUYLER, JR.
Attesting Officer                                  Commissioner of Patents